United States Patent [19]

Matsuda et al.

[11] 4,351,811

[45] Sep. 28, 1982

[54] PROCESS FOR REDUCING AN ELIMINATING NITROGEN OXIDES IN AN EXHAUST GAS

[75] Inventors: Shinpei Matsuda; Akira Kato; Shigeo Uno, all of Hitachi; Youichi Sakuta, Katsuta; Fumito Nakajima, Hitachi, all of Japan

[73] Assignees: Hitachi, Ltd.; Babcock-Hitachi Kabushiki-Kaisha, both of Tokyo, Japan

[21] Appl. No.: 926,111

[22] Filed: Jul. 19, 1978

[30] Foreign Application Priority Data

Jul. 20, 1977 [JP] Japan .................................. 52-86049
Jul. 22, 1977 [JP] Japan .................................. 52-87299

[51] Int. Cl.$^3$ ............................................. B01D 53/36
[52] U.S. Cl. .................................... 423/239; 423/235; 423/402
[58] Field of Search ..................... 423/235, 239 A, 402

[56] References Cited

U.S. PATENT DOCUMENTS

3,453,071 7/1969 Schmitt et al. ........................ 423/235
4,024,219 5/1977 Takahashi ............................. 423/400
4,085,193 4/1978 Nakajima et al. ................... 423/239 A

FOREIGN PATENT DOCUMENTS

1259298 1/1968 Fed. Rep. of Germany ... 423/239 A
51-45672 4/1976 Japan ................................. 423/213.2
51-50281 5/1976 Japan ....................................... 55/68
1388669 3/1975 United Kingdom ................ 423/235

OTHER PUBLICATIONS

Svortsov et al., "The Soviet Chemical Industry", vol. No. 6, 1970, pp. 45–48.

*Primary Examiner*—Earl C. Thomas
*Attorney, Agent, or Firm*—Antonelli, Terry & Wands

[57] ABSTRACT

The concentrations of NO and $NO_2$ in nitrogen oxides contained in an exhaust gas are adjusted to substantially equal mol concentrations, whereupon the exhaust gas is held in contact with a metallic oxide catalyst together with ammonia. Owing to the adjustment of the NO and $NO_2$ concentrations in the nitrogen oxides, the reaction rate is enhanced, and the nitrogen oxides are reduced even at a low temperature. The adjustment of the concentrations of NO and $NO_2$ in the nitrogen oxides is done by the oxidation of NO with ozone, the catalytic oxidation of NO with air or oxygen, the addition of nitric acid, the addition of NO or $NO_2$, etc.

15 Claims, No Drawings

PROCESS FOR REDUCING AN ELIMINATING NITROGEN OXIDES IN AN EXHAUST GAS

BACKGROUND OF THE INVENTION

This invention relates to a process for reducing and eliminating nitrogen oxides in a waste gas which contains the nitrogen oxides and which is emitted from various industrial plants and processes such as a combustion furnace, a nitric acid-producing plant, a fertilizer manufacturing plant and a metal pickling process, thereby to render the waste gas innocuous.

An exhaust gas generated by the combustion of various fossil fuels contains very small quantities of nitrogen oxides $NO_x$, for example, NO (nitrogen monoxide), $NO_2$ (nitrogen dioxide), $N_2O_4$, $N_2O_5$ and $N_2O$, which provide for air pollution. Most of nitrogen oxides in the exhaust gases of petroleum fractions (such as naphtha, kerosene, light oil and heavy oil), coal etc. are nitrogen monoxide NO, and a variety of denitrating methods are being developed at present. As one of the methods of eliminating NO, there is a process in which NO is decomposed into nitrogen and water in the presence of a catalyst by employing ammonia $NH_3$ as a reductant.

The reductive reaction of NO with $NH_3$ has been considered to proceed according to the following reaction formula:

$$3NO + 2NH_3 \rightarrow (5/2)N_2 + 3H_2O \qquad (1)$$

It has recently been verified by the inventors, however, that in the presence of oxygen the reduction proceeds according to the reaction of the following formula:

$$NO + NH_3 + \tfrac{1}{4}O_2 \rightarrow N_2 + (3/2)H_2O \qquad (2)$$
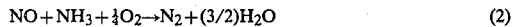

(Refer to Official Gazette of Japanese Unexamined Published Patent Application No. 51-56284). As catalysts for promoting the reaction (2), many have been proposed. There can be mentioned, for example, catalysts of mixed oxides containing vanadium (Japanese Unexamined Published Patent Application No. 49-122473); catalysts with molybdenum, tungsten and vanadium added to tin oxides (Japanese Unexamined Published Patent Application Nos. 50-71564 and 51-45689); and catalysts, some of the inventors having participated in the inventions thereof, which contain titanium oxides as their principal constituents and in which are added oxides of iron (Japanese Examined Published Patent Application No. 52-6954), copper, nickel and cobalt (Japanese Examined Published Patent Application No. 52-6953), molybdenum (Japanese Unexamined Published Patent Application No. 50-89291), tungsten (Japanese Unexamined Published Patent Application No. 50-89264), vanadium (Japanese Unexamined Published Patent Application No. 50-128680), uranium (Japanese Unexamined Published Patent Application No. 51-21568), chromium (Japanese Unexamined Published Patent Application No. 51-68473), cerium (Japanese Unpublished Patent Application No. 50-117753), etc. Excepting the catalysts which contain titanium oxides as their principal constituents, alumina or silica alumina is generally used as a catalyst support. In case of the treatment of an exhaust gas containing sulfur oxides, the catalysts employing the alumina type support have the catalytic activity quickly degraded because the alumina turns into aluminum sulfate. The catalysts containing titanium oxides as their principal constituents to which the oxides of Fe, Cu, Ni, Co, Mo, W, V, U, Cr and Ce are added in a range of, for example, at most 50 weight % are not vitiated by the sulfur oxides. Besides, their activities for the reaction of NO and $NH_3$ are very excellent.

With the catalysts as stated above and under ideal conditions, approximately 90% or more of $NO_x$ can be eliminated from within the exhaust gas. However, when the temperature of the exhaust gas is 250° C. or below, or when the space velocity is increased, the rate of eliminating $NO_x$ lowers, and problems are involved in the application to a large-scale actual plant. If the range of effective reaction temperature can be expanded to a lower temperature region, it will become unnecessary to preheat the exhaust gas to the optimum temperature, which is economically advantageous. If the reaction rate can be raised, the reaction will proceed with a smaller quantity of catalyst, and the required power for transferring the exhaust gas will decrease, which also enhances economy.

SUMMARY OF THE INVENTION

An object of this invention is to provide a process for eliminating nitrogen oxides in an exhaust gas efficiently at a high denitrating rate.

Another object is to provide an economical treatment process capable of eliminating nitrogen oxides at temperatures lower than used in the prior art processes.

The process for eliminating nitrogen oxides in an exhaust gas according to this invention is effected so that nitrogen monoxide and nitrogen dioxide in the exhaust gas are put into substantially equal mol concentrations, and the resulting gas is held in contact with a metallic oxide catalyst together with a reducing agent.

More concretely, the mol ratio of $NO/(NO+NO_2)$ in the nitrogen oxides contained in the exhaust gas is adjusted so as to become approximately 0.4–0.6 by changing part of the nitrogen oxides in the exhaust gas or by externally adding a necessary type of nitrogen oxide, whereupon the exhaust gas is held in contact with the metallic oxide catalyst, especially a titanium oxide type catalyst, together with the reducing agent of ammonia at a temperature in the range of 100° to 550° C. preferably 150° C. to 350° C.

Besides the reaction between NO and $NH_3$ in the heretofore described case of using the various metallic oxide catalysts, the inventors studied in detail the reaction between $NO_2$ and $NH_3$ and the reaction between $(NO+NO_2)$ and $NH_3$. The reaction between NO and $NH_3$ proceeds according to the reaction formula (2). The reaction between $NO_2$ and $NH_3$ proceeds under coexistence or non-coexistence with oxygen according to the following reaction formula as has hitherto been proposed:

$$3NO_2 + 4NH_3 \rightarrow (7/2)N_2 + 6H_2O \qquad (3)$$
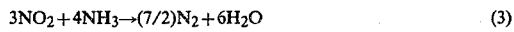

Further, the reaction between $NH_3$ and a gas in which NO and $NO_2$ and contained at equal molar proportions proceeds according to the following formula:

$$NO + NO_2 + 2NH_3 \rightarrow 2N_2 + 3H_2O \qquad (4)$$
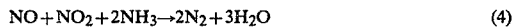

Although the reaction rates of the reactions (2), (3) and (4) greatly vary depending on the reaction temperature and the sort of the catalyst used, that of the reaction (4) is, in general, 2 to 10 times as high as those of the reactions (2) and (3). Especially when the titanium oxide type catalyst is used, the reaction (4) proceeds 4 to 10 times faster than the reactions (2) and (3).

As regards the reaction temperature, it has been experimentally verified that the reaction (4) exhibits the small denitrating rate at temperatures which are 100° to 150° C. lower than in the reactions (2) and (3).

DESCRIPTION OF THE PREFERRED EMBODIMENTS

According to this invention, the mol concentrations of nitrogen monoxide and nitrogen dioxide in an exhaust gas to be treated are adjusted so as to become substantially equal, whereupon the nitrogen oxides are reacted by the use of a reductant of ammonia and a catalyst into nitrogen gas and water. Usually, the relative percentage of NO and $NO_2$ in the nitrogen oxides being treated is more than 90%.

In the ordinary combustion exhaust gases, most of nitrogen oxides are in the form of nitrogen monoxide, and the mole ratio of $NO_2/NO$ is 0.1 or below. In treating such an exhaust gas, part of NO is oxidized into $NO_2$ so that the concentrations of NO and $NO_2$ in the exhaust gas after the oxidation may usually be made $NO/(NO+NO_2)=0.4$ to 0.6 (mole ratio) though this value varies depending on the required percentage of eliminating nitrogen oxides (percentage of denitration). By adjusting the rates of NO and $NO_2$ in this manner, the denitrating percentage by $NH_3$ is easily made 80% or higher.

As a method of oxidizing NO into $NO_2$, there is a process wherein the oxidation is carried out with oxygen in the presence of a catalyst. Usable as the catalyst is any of the manganese oxides (refer to the Official Gazette of Japanese Unexamined Published Patent Application No. 50-62859) which have already been known or $TiO_2$—$MnO_2$, $TiO_2$—CoO, etc. which the inventors have found out. The temperature of the oxidizing reaction may be to the same extent as a temperature at which the nitrogen oxides are reduced with ammonia, that is, 100° to 350° C.

Another method of oxidizing NO into $NO_2$ is a process wherein ozone ($O_3$) is employed. The reaction of the oxidation with ozone is represented by the following formula, and the reaction rate thereof is very high:

$$NO+O_3=NO_2+O_2 \qquad (5)$$

At temperatures at which the self-decomposition of ozone does not take place, the reaction (5) proceeds very selectively. Regarding the quantity of addition of ozone, therefore, 0.1 to 1, preferably 0.4 to 0.6 mol, is suitable per mol of NO in the exhaust gas. The place in which the ozone is added may be the side of a reaction tower in which the nitrogen oxides are reduced by the use of $NH_3$. It is not always necessary that NO and $O_3$ have perfectly reacted before entering the reaction tower. That is, the reaction between NO and $O_3$ is considered to proceed also within the denitrating reaction tower. In this case, the two stages of reactions in which NO turns into $NO_2$ and further the three of NO, $NO_2$ and $NH_3$ reaction will take place substantially successively, and the reaction formula will be represented as follows:

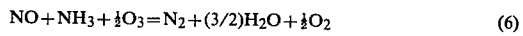

$$NO+NH_3+\tfrac{1}{2}O_3=N_2+(3/2)H_2O+\tfrac{1}{2}O_2 \qquad (6)$$

Although this reaction formula resembles the reaction formula (2), the reaction rate of the reaction (6) is much higher than that of the reaction (2).

Another expedient for adjusting the concentrations of NO and $NO_2$ in the exhaust gas to be treated consists in adding nitric acid to the gas and converting nitrogen monoxide into nitrogen dioxide according to the following reaction:

$$2HNO_3+NO=3NO_2+H_2O \qquad (7)$$

In accordance with this reaction, 3 mols of $NO_2$ are produced from 2 mols of nitric acid, and besides, 1 mol of NO is decreased. Accordingly, when the nitric acid added amounts to a half of the concentration of NO in the gas to be treated, a gas in which NO and $NO_2$ are in equal molar amounts is formed. The theoretically required quantity of ammonia becomes 1.5 times as large as the quantity of original NO in terms of molar proportions. The concentration of the nitric acid to be used is not especially restricted, and either dilute nitric acid or undiluted nitric acid may be used. The nitric acid is added to the exhaust gas in such a way that 1 normal aqueous solution of $HNO_3$ is prepared and then injected into a reactor. Alternatively, the undiluted nitric acid is added into a reactor by spraying it with air. It is suitable to make the quantity of the additive nitric acid 0.2 to 1 times (mol ratio), preferably 0.4 to 0.6 times, as large as that of NO in the exhaust gas.

As a further method of adjusting the concentrations of NO and $NO_2$, there is considered a process in which a predetermined amount of NO or $NO_2$ is added to the gas to be treated. This process is easy, but when compared with the adjusting methods thus far described, it has the disadvantage that the amount of $NO_x$ to be reduced by $NH_3$ increases.

Since the reaction between $NH_3$ and the exhaust gas containing NO and $NO_2$ at substantially equal molar concentrations proceeds as indicated by the reaction formula (4), the proper quantity of the additive $NH_3$ is 0.8 to 2.0 mol times, preferably 0.8 to 1.2 mol times, as large as the total quantity of NO and $NO_2$. By making the quantity of the additive $NH_3$ as small as $1\pm 0.2$ mol times with respect to the quantity of $NO_x(=NO+NO_2)$, unreacted $NH_3$ contained in the processed exhaust gas can be suppressed to a small quantity.

The exhaust gas in which the concentrations of NO and $NO_2$ have become substantially equal and to which $NH_3$ has been added is held in contact with a catalyst. Then, the nitrogen oxides in the exhaust gas are decomposed into nitrogen and water in accordance with the reaction (4).

As the catalysts which are employed for reducing $NO_x$ in the presence of ammonia, there have been known oxides of platinum group metals, vanadium, iron, copper, molybdenum, tungsten, chromium etc. or mixed oxides thereof. These metallic oxide catalysts are usually used in the form in which they are carried by a support such as alumina and silica alumina. As the reducing catalysts for use in this invention, however, ones are the most appropriate which contain titanium oxides as their principal constituents and in which is added an oxide of at least one metal selected from the group consisting of iron, copper, nickel, cobalt, molybdenum, tungsten, vanadium, chromium and cerium. The reason therefor is that these catalysts, the principal constituents of which are titanium oxides, are especially suitable in case where the exhaust gas to be treated contains sulfur oxides ($SO_2$, $SO_3$, etc.). The catalysts whose principal constituents are titanium oxides are not poisoned or vitiated by the sulfur oxides, and their activities for the reaction (4) are ordinarily higher than the alumina support catalysts. In case where the exhaust gas contains quite no, or substantially no sulfur oxide, it is also possible to use catalysts of iron oxide—tungsten oxide (refer to the Official Gazette of Japanese Unexamined Published Patent Application No. 50-57946), iron oxide-tin oxide (Japanese Unexamined Published Patent Application No. 50-89287), etc. These catalysts, however, are inferior in the denitrating percentage to the titanium type catalysts.

The reduction of the nitrogen oxides by $NH_3$ is executed at temperatures of 100° to 550° C., preferably 150° to 350° C. Although the reaction temperature may be higher than in the preferable range, also the reaction (2) between NO and $NH_3$ proceeds speedily at high temperatures above, e.g., 400° C., which makes it meaningless to provide the additional step of oxidizing part of NO into $NO_2$ and rendering their concentrations in the exhaust gas substantially equal. In case where the reaction temperature is lower than 100° C., the reaction rate is slow. Therefore, the required amount of the catalyst becomes large uneconomically. Further, troubles such as precipitation of ammonium nitrate take place unfavorably.

The space velocity of the exhaust gas in the case of reducing the nitrogen oxides with ammonia needs to be made 2,000 to 100,000 $h^{-1}$ (calculated for an empty tower, N.T.P.) and to be selected depending on the reaction temperature and the shape of the catalyst. As regards the configuration of the reaction tower, any of a stationary bed, a movable bed, a fluid bed, etc. can be used. As regards the shape of the catalyst, there can be used any of columnar, cylindrical and honeycomb ones or flat and meshy ones, etc.

Now, an example of manufacture of catalysts will be given as a reference example. (These catalysts were used in examples to be described later).

REFERENCE EXAMPLE (MANUFACTURE OF CATALYSTS)

Slurry of metatitanic acid [$TiO(OH)_2$] was employed as the raw material of titanium oxide. Respective predetermined amounts of ammonium meta-vanadate, chromium nitrate, ammonium para-molybdate, ammonium para-tungstate, iron nitrate, copper nitrate and cerium nitrate were mixed into the slurry, and the mixtures were sufficiently kneaded. After drying and pulverizing the mixtures, they were molded into a diameter of 5 mm and a length of approximately 5 mm by a tablet compressing machine. The molded compacts were baked at 400°-550° C. to obtain the catalysts. The metallic atom compositions of the respective catalysts acquired were as follows:

| Catalyst A: | Ti.V<br>$TiO_2$—$V_2O_5$ | (atomic ratio Ti:V = 94:6) | |
|---|---|---|---|
| Catalyst B: | Ti.Cr<br>$TiO_2$—$Cr_2O_3$ | (atomic ratio Ti:Cr = 90:10) | |
| Catalyst C: | Ti.Mo<br>$TiO_2$—$MoO_3$ | (atomic ratio Ti:Mo = 80:20) | |
| Catalyst D: | Ti.W<br>$TiO_2$—$WO_3$ | (atomic ratio Ti:W = 90:10) | |
| Catalyst E: | Ti.Fe<br>$TiO_2$—$Fe_2O_3$ | (atomic ratio Ti:Fe = 60:40) | |
| Catalyst F: | Ti.Cu<br>$TiO_2$—CuO | (atomic ratio Ti:Cu = 80:20) | |
| Catalyst G: | Ti.Ce<br>$TiO_2$—$CeO_2$ | (atomic ratio Ti:Ce = 90:10) | |
| Catalyst H: | Fe.W<br>$Fe_2O_3$—$WO_3$ | (atomic ratio Fe:W 90:10) | with $Al_2O_3$ support |
| Catalyst I: | Fe.Sn<br>$Fe_2O_3$—$SnO_2$ | (atomic ratio Fe:Sn = 50:50) | with $Al_2O_3$ support |
| Catalyst J: | Cu.Mo<br>CuO—$MoO_3$ | (atomic ratio Cu:Mo = 50:50) | with $Al_2O_3$ support |

Now, this invention will be described in connection with examples which are illustrative but not limitative of said invention.

EXAMPLE 1 AND COMPARATIVE EXAMPLES

The reaction rates of the reaction between NO and $NH_3$, the reaction between (NO+$NO_2$) and $NH_3$ and the reaction between $NO_2$ and $NH_3$ were compared. Each of the catalysts A, C, E, F, G and H manufactured in the foregoing reference example and amounting to 40 ml was packed in the central part of a reaction tube having an inside diameter of 50 mm and a length of 50 cm, and three sorts of exhaust gases having compositions listed in Table 1 were caused to flow through the reaction tube at a space velocity of 12,000 $h^{-1}$. The concentrations of NO and $NO_2$ at the inlet and outlet of the reaction tube were analyzed by the chemiluminescence process, to evaluate the rate of eliminating nitrogen oxides. The results are indicated in Table 2.

TABLE 1

| Composition | Comparative example, Exhaust gas A | Example 1, Exhaust gas B | Comparative example, Exhaust gas C |
|---|---|---|---|
| NO (ppm) | 200 | 100 | — |
| $NO_2$ (ppm) | — | 100 | 200 |
| $NH_3$ (ppm) | 220 | 220 | 290 |
| $O_2$ (%) | 3 | 3 | 3 |
| $CO_2$ (%) | 12 | 12 | 12 |
| $H_2O$ (%) | 12 | 12 | 12 |
| $N_2$ | balance | balance | balance |

TABLE 2

| | Comparative example, Exhaust gas A | | Example 1, Exhaust gas B | | Comparative example, Exhaust gas C | |
|---|---|---|---|---|---|---|
| Reaction temperature (°C.) | 200 | 300 | 200 | 300 | 200 | 300 |
| | Rate of eliminating nitrogen oxides (%) | | | | | |
| Catalyst A | 83 | 98 | >98 | >98 | 44 | 85 |
| Catalyst C | <10 | 93 | 95 | >98 | 20 | 97 |
| Catalyst E | <10 | 90 | 90 | >98 | <10 | 93 |
| Catalyst F | <10 | 89 | 94 | >98 | 37 | 90 |
| Catalyst G | 30 | 90 | 97 | >98 | 25 | 88 |
| Catalyst H | <10 | 83 | 88 | 97 | <10 | 75 |

As apparent from Table 2, the exhaust gas B (a gas containing NO and $NO_2$ at a mol ratio of 1:1) exhibits a particular fast reaction with $NH_3$ when compared with the exhaust gas A (a gas containing only NO) and the exhaust gas C (a gas containing only $NO_2$).

$O_3$ generated by an ozonator was added into an exhaust gas at the inlet of a reaction tube, whereupon the reaction was caused to proceed. The exhaust gas had a composition indicated in Table 3. The catalysts A, B, D, E and I produced in the reference example were used, and the reaction temperatures were 150° C., 200° C., and 300° C. In the same way as in Example 1, the rate of eliminating the nitrogen oxides was assessed. The results are given in Table 4.

TABLE 3

| Composition | Exhaust gas D |
|---|---|
| NO (ppm) | 300 |
| $NH_3$ (ppm) | 330 |
| $O_3$ (ppm) | 180 |
| $O_2$ (%) | 5 |
| $CO_2$ (%) | 12 |
| $H_2O$ (%) | 12 |
| $N_2$ | balance |

TABLE 4

| | Reaction temperature (°C.) | | |
|---|---|---|---|
| | 150 | 200 | 300 |
| | rate of eliminating nitrogen oxides (%) | | |
| Catalyst A | 95 | >98 | >98 |
| Catalyst B | 84 | 96 | >98 |
| Catalyst D | 63 | 90 | >98 |
| Catalyst E | 76 | 90 | >98 |
| Catalyst I | 53 | 81 | 95 |

It is understood from Table 4 that, in case where the oxidation of NO by $O_3$ and the reduction of $NO_x$ by $NH_3$ are carried out in the identical reaction tube, an excellent effect of denitration is achieved.

EXAMPLE 3

Both the reactions of the oxidation of NO by oxygen and the reduction of $(NO+NO_2)$ by $NH_3$ were executed in two stages, and the denitrating rate was measured by the same method as in Example 1. An exhaust gas used had a composition given in Table 5 below.

TABLE 5

| Composition | Exhaust gas E |
|---|---|
| NO (ppm) | 300 |
| $NH_3$ (ppm) | 330 (added in the reducing stage) |
| $O_2$ (%) | 10 |
| $CO_2$ (%) | 12 |
| $H_2O$ (%) | 12 |
| $N_2$ | balance |

For the oxidation of NO, the following 4 sorts of catalysts were employed:

| Oxidizing catalyst a: | $MnO_2$—$TiO_2$ ($MnO_2$, 10 weight %) |
| Oxidizing catalyst b: | $MnO_2$—$Fe_2O_3$ (atomic ratio, Mn:Fe = 95:5) |
| Oxidizing catalyst c: | Pt—$TiO_2$ (Pt, 0.1 weight %) |
| Oxidizing catalyst d: | CoO—$TiO_2$ (CoO, 15 weight %) |

The exhaust gas E was passed through an NO-oxidizing catalyst layer at a desired space-velocity value of 2,000–5,000 $h^{-1}$, and after adding a predetermined amount of $NH_3$, it was caused to flow through a $NO_x$-reducing catalyst layer at a space velocity of 20,000 $h^{-1}$. The reaction temperature was made 300° C. for the NO-oxidizing step, and 200° C. for the $NO_x$-reducing step. By controlling the passing velocity through the oxidizing catalyst layer, $NO/(NO+NO_2)$ was adjusted to 0.4–0.6.

The results obtained are indicated in Table 6.

TABLE 6

| Oxidation of NO | | Nitrogen | |
|---|---|---|---|
| Oxidizing catalyst | Desired value of space velocity ($h^{-1}$) | oxides-reducing catalyst | Nitrogen oxides-eliminating rate (%) |
| Catalyst a | 2,000 | Catalyst C | 80 |
| Catalyst b | 5,000 | Catalyst C | 94 |
| Catalyst c | 5,000 | Catalyst D | 85 |
| Catalyst d | 4,000 | Catalyst E | 81 |
| Catalyst d | 4,000 | Catalyst J | 71 |

As apparent from Table 6, even when the oxidizing reaction and the reducing reaction are executed in the two stages, the nitrogen oxides can be eliminated at a denitrating rate higher than 70%.

EXAMPLE 4

A stream of the exhaust gas containing 300 ppm of NO and 10% of $O_2$ as indicated in Table 5 was divided into two streams. One stream was passed through a catalyst layer packed with the oxidizing catalyst b composed of $MnO_2$—$Fe_2O_3$ (atomic ratio, Mn:Fe=95:5), under conditions of a space velocity of 3,000 $h^{-1}$ and a reaction temperature of 250° C. The other stream was caused to bypass the oxidizing catalyst layer, and downstream of the oxidizing catalyst layer, it was caused to join the exhaust gas having passed through the oxidizing catalyst layer. Then, 330 ppm of $NH_3$ was added to the exhaust gas.

Subsequently, the exhaust gas with $NH_3$ added thereto was passed through a layer of the nitrogen oxides-reducing catalyst composed of Ti.Mo (Catalyst C) under conditions of a space velocity of 15,000 $h^{-1}$ and a reaction temperature of 250° C. The rate of reducing the nitrogen oxides was higher than 98%.

EXAMPLE 5

A test of denitration was made by the use of an exhaust gas containing sulfur oxides as seen from its composition given in Table 7. The reaction was carried out continuously for 500 hours under conditions of a space velocity of 30,000 $h^{-1}$ and a reaction temperature of 350° C. The results are indicated in Table 8.

TABLE 7

| Composition | Exhaust gas F |
|---|---|
| NO (ppm) | 100 |
| $NO_2$ (ppm) | 100 |
| $NH_3$ (ppm) | 220 |
| $SO_2$ (ppm) | 500 |
| $SO_3$ (ppm) | 100 |
| $O_2$ (%) | 3 |
| $H_2O$ (%) | 12 |
| $CO_2$ (%) | 12 |
| $N_2$ | balance |

TABLE 8

| Reaction time (h) | Catalyst | Catalyst | Catalyst D | Catalyst H |
|---|---|---|---|---|
| | Rate of eliminating nitrogen oxides (%) | | | |
| At starting | >98 | 94 | 93 | 85 |
| 20 | 97 | 92 | 93 | 80 |
| 40 | 97 | 92 | 93 | 75 |
| 60 | 96 | 92 | 92 | 72 |
| 100 | 96 | 92 | 92 | 69 |
| 500 | 95 | 90 | 90 | — |

As apparent from Table 8, according to this example, even in case where the invention is applied to the exhaust gas containing sulfur oxides, good denitrating rates are attained without being vitiated by the sulfur oxides.

EXAMPLE 6

In this example, comparisons were made of the reaction rates of the reaction between nitrogen monoxide and ammonia and the reaction between a gas with nitric acid added to nitrogen monoxide and ammonia. Each of the catalysts A–J amounting to 40 ml was packed in the central part of a reaction tube made of quartz glass and having an inside diameter of 50 mm as well as a length of 50 cm, and each of exhaust gases G and H of compositions indicated in Table 9 was caused to flow through the reaction tube at a space velocity of 15,000 h$^{-1}$. The $NO_x$ ($NO + NO_2$) concentrations at the inlet and outlet of the reaction tube were analyzed by the chemiluminescence process, to evaluate the percentage of removal or elimination of the nitrogen oxides.

TABLE 9

| Composition | Comparative example, Exhaust gas G | Exhaust gas H |
|---|---|---|
| NO | 300 ppm | 200 ppm |
| $HNO_3$ | — | 100 ppm |
| $NH_3$ | 330 ppm | 330 ppm |
| $O_2$ | 3% | 3% |
| $CO_2$ | 12% | 12% |
| $H_2O$ | 12% | 12% |
| $N_2$ | balance | balance |

The addition of $HNO_3$ in the exhaust gas H was done by injecting 1 normal aqueous solution of $HNO_3$ into the reactor from a pipe having an inside diameter of 1 mm.

The results of the experiments employing the catalysts A–J are given in Table 10.

TABLE 10

| | Exhaust gas | | | | | |
|---|---|---|---|---|---|---|
| | Comparative example, Exhaust gas G | | | Example 6, Exhaust gas H | | |
| | Temperature (°C.) | | | | | |
| | 150 | 250 | 350 | 100 | 150 | 250 | 350 |
| Catalyst | $NO_x$ eliminating rate (%) | | | | | | |
| A | 57 | 94 | 99 | 57 | 88 | >99 | >99 |
| B | <5 | 53 | 95 | 20 | 74 | 97 | >99 |
| C | <5 | 58 | 96 | 35 | 77 | 98 | >99 |
| D | <5 | 48 | 92 | <10 | 61 | 92 | >99 |
| E | <5 | 54 | 95 | <10 | 72 | 96 | >99 |
| F | <5 | 51 | 96 | <10 | 64 | 93 | >99 |
| G | 11 | 67 | 96 | 30 | 82 | 99 | >99 |
| H | <5 | 63 | 87 | <10 | 43 | 90 | 98 |
| I | <5 | 55 | 83 | <10 | 31 | 89 | 97 |
| J | <5 | 42 | 80 | <10 | 33 | 85 | 97 |

As indicated in Table 10, the gas with $HNO_3$ added thereto is particularly fast in the reaction with $NH_3$ when compared with the gas containing only NO.

EXAMPLE 7

In this example, an exhaust gas containing sulfur oxides was used, the exhaust gas having a composition as indicated in Table 11. A continuous test for 100 hours was carried out under conditions of a space velocity of 30,000 h$^{-1}$ and a reaction temperature of 350° C.

The catalysts A–J were used, and the same equipment as in Example 6 was employed. The results are given in Table 12.

TABLE II

| Composition | Exhaust gas I |
|---|---|
| NO | 200 ppm |
| $HNO_3$ | 100 ppm |
| $NH_3$ | 360 ppm |
| $SO_2$ | 500 ppm |
| $SO_3$ | 100 ppm |
| $O_2$ | 3% |
| $CO_2$ | 12% |
| $H_2O$ | 12% |
| $N_2$ | balance |

TABLE 12

| Reaction time (h) | Catalyst | | | | | | | |
|---|---|---|---|---|---|---|---|---|
| | A | B | C | D | E | F | G | H |
| | $NO_x$ eliminating rate (%) | | | | | | | |
| at starting | 99 | 93 | 95 | 90 | 94 | 91 | 96 | 83 |
| 20 | 98 | 92 | 94 | 90 | 92 | 90 | 95 | 77 |
| 40 | 97 | 92 | 94 | 89 | 91 | 89 | 95 | 73 |
| 60 | 97 | 92 | 93 | 89 | 91 | 89 | 94 | 69 |
| 100 | 97 | 91 | 93 | 89 | 90 | 89 | 94 | 60 |

As understood from the results of Table 12, even when the exhaust gas contains the sulfur oxides, good denitrating rates are achieved without the degradation of the catalytic activity.

What is claimed is:

1. A process for reducing the concentration of nitrogen oxides in an exhaust gas containing nitrogen oxides, comprising the steps of:
   (a) adjusting the mol ratio of NO to $NO_2$ in the exhaust gas such that the exhaust gas contains approximately equal molar amounts of NO and $NO_2$,
   (b) mixing the exhaust gas having the adjusted mol ratio of NO to $NO_2$ with an ammonia-containing gas, in which the mol ratio of ammonia to the total of NO and $NO_2$ in the exhaust gas is about 0.8 to 2:1, and
   (c) contacting the resultant mixture with a metallic oxide catalyst at a temperature in the range of 100°–550° C., thereby to reduce nitrogen oxides into nitrogen gas and water, said metallic oxide catalyst containing titanium oxide as its first constituent and an oxide of at least one element selected from the group consisting of iron, copper, nickel, cobalt, molybdenum, tungsten, vanadium, chromium and cerium as its active component.

2. A process for reducing the concentration of nitrogen oxides in an exhaust gas as defined in claim 1, wherein the molar ratio of NO to $NO_2$ originally in said exhaust gas is greater than 1, and wherein, in adjusting the mol ratio of NO to $NO_2$, ozone is added to the exhaust gas, whereby said ozone oxidizes the NO to $NO_2$, the ozone being added in an amount such that the mol ratio of the ozone to the NO in the exhaust gas is about 0.4 to 1:1.

3. A process for reducing the concentration of nitrogen oxides in an exhaust gas as defined in claim 2, wherein the mol ratio of ozone to NO in the exhaust gas is 0.4 to 0.6:1.

4. A process for reducing the concentration of nitrogen oxides in an exhaust gas as defined in claim 1, wherein the mol ratio of NO to $NO_2$ originally in the exhaust gas is greater than 1 and wherein, in adjusting the mol ratio of NO to $NO_2$, oxygen is added to the exhaust gas in the presence of an oxidizing catalyst, whereby NO is oxidized to $NO_2$.

5. A process for reducing the concentration of nitrogen oxides in an exhaust gas as defined in claim 1, wherein the mol ratio of NO to $NO_2$ originally in the exhaust gas is greater than 1 and wherein, in adjusting the mol ratio of NO to $NO_2$, nitric acid is added to the exhaust gas, whereby NO in the exhaust gas is oxidized to $NO_2$.

6. A process for reducing the concentration of nitrogen oxides in an exhaust gas as defined in claim 5, wherein nitric acid is added to the exhaust gas in an amount such that the mol ratio of the nitric acid to NO is about 0.2 to 1:1.

7. A process for reducing the concentration of nitrogen oxides in an exhaust gas as defined in claim 6, wherein the mol ratio of nitric acid added to the exhaust to NO is 0.4 to 0.6:1.

8. A process for reducing the concentration of nitrogen oxides, containing nitric oxide as a great portion thereof, in an exhaust gas, comprising the steps of:
  (a) separating the exhaust gas into two streams,
  (b) adding oxygen to one of the streams in the presence of an oxidizing catalyst, whereby NO in said one of the streams is oxidized to $NO_2$,
  (c) combining said one of the streams with the other, a sufficient amount of the NO in said one of the streams having been oxidized to $NO_2$ to adjust the mol ratio of NO to $NO_2$ such that the combined gas streams contain approximately equal amounts of NO and $NO_2$;
  (d) mixing the combined streams with an ammonia-containing gas, in which the molar ratio of the ammonia to the total of NO and $NO_2$ in the combined streams is about 0.8 to 2:1 and
  (e) contacting the resultant mixture with a metallic oxide catalyst at a temperature of 100° to 550° C., thereby to reduce nitrogen oxides into nitrogen gas and water, said metallic oxide catalyst containing titanium oxide as its first constituent and an oxide of at least one element selected from the group consisting of iron, copper, nickel, cobalt, molybdenum, tungsten, vanadium, chromium and cerium as its active component.

9. A process for reducing the concentration of nitrogen oxides in an exhaust gas as defined in claim 1, 2, 4, 6 or 8, wherein the mol ratio of NO to $NO_2$ is adjusted such that the mol ratio of NO to the sum of NO and $NO_2$ is about 0.4 to 0.6:1.

10. A process for reducing the concentration of nitrogen oxides in an exhaust gas as defined in claim 4 or 8, wherein said oxidizing catalyst comprises at least one selected from the group consisting of $MnO_2$—$TiO_2$, $MnO_2$—$Fe_2O_3$, Pt—$TiO_2$ and CoO—$TiO_2$.

11. A process for reducing the concentration of nitrogen oxides in an exhaust gas as defined in claim 1 or 8, wherein the resultant mixture is contacted with said metallic oxide catalyst at a temperature of 150°–350° C.

12. A process for reducing the concentration of nitrogen oxides in an exhaust gas as defined in claims 4 or 8, wherein the NO is oxidized in the presence of the oxidizing catalyst at a temperature of 100° to 350° C.

13. A process for reducing the concentration of nitrogen oxides in an exhaust gas as defined in claim 1 or 8, wherein the mol ratio of ammonia to the total of NO and $NO_2$ is 0.8 to 1.2:1.

14. A process for reducing the concentration of nitrogen oxides, containing nitric oxide as a great portion thereof, in an exhaust gas comprising the steps of:
  (a) adding ozone to the exhaust gas, the molar ratio of the ozone added to the nitric oxide in the exhaust gas being 0.4 to 0.6:1, whereby NO is oxidized to $NO_2$ so as to adjust the mol ratio of NO to $NO_2$ in the exhaust gas such that the exhaust gas contains approximately equal amounts of NO and $NO_2$,
  (b) mixing ammonia gas with the exhaust gas containing approximately equal amounts of NO and $NO_2$, the amount of ammonia mixed with the exhaust gas being such that the mol ratio of the ammonia to the total of NO and $NO_2$ in the exhaust gas is 0.8 to 1.2:1, and
  (c) contacting the resultant mixture with a metallic oxide catalyst comprising $TiO_2$—$V_2O_5$ at a temperature of 200° C., thereby to reduce nitrogen oxides into nitrogen gas and water.

15. A process for reducing the concentration of nitrogen oxides in an exhaust gas as defined in claims 2, 4, 5, 8 or 14, wherein the mol ratio of $NO_2$ to NO originally in the exhaust gas is equal to or less than 0.1:1.

* * * * *